United States Patent
Brown et al.

(10) Patent No.: US 9,244,987 B2
(45) Date of Patent: Jan. 26, 2016

(54) ETL DATA TRANSIT METHOD AND SYSTEM

(75) Inventors: Arthur James Brown, Conyers, GA (US); Steve Bilodeau, Cumming, GA (US)

(73) Assignee: Cellco Partnership, Basking Ridge, NJ (US)

( * ) Notice: Subject to any disclaimer, the term of this patent is extended or adjusted under 35 U.S.C. 154(b) by 700 days.

(21) Appl. No.: 13/485,411

(22) Filed: May 31, 2012

(65) Prior Publication Data

US 2013/0325788 A1     Dec. 5, 2013

(51) Int. Cl.
*G06F 17/30* (2006.01)
(52) U.S. Cl.
CPC .................................. *G06F 17/30563* (2013.01)
(58) Field of Classification Search
CPC .............. G06F 17/30; G06F 17/30563; G06F 17/30592; G06F 17/30345
USPC .......................................... 707/602, 600, 601
See application file for complete search history.

(56) References Cited

U.S. PATENT DOCUMENTS

| | | | |
|---|---|---|---|
| 7,711,660 B1 * | 5/2010 | Gentile et al. ................... 706/8 |
| 7,970,732 B2 | 6/2011 | Jernigan et al. | |
| 2005/0049996 A1 * | 3/2005 | Srinivasan et al. ................ 707/1 |
| 2009/0070347 A1 * | 3/2009 | Mignet et al. .................. 707/100 |
| 2012/0089562 A1 * | 4/2012 | Deremigio et al. ............ 707/602 |
| 2013/0151491 A1 * | 6/2013 | Gislason ....................... 707/696 |
| 2013/0268567 A1 * | 10/2013 | Adjei-Banin et al. ........ 707/812 |

OTHER PUBLICATIONS

"Extract, transform, load," Wikipedia, the free encyclopedia, http://en.wikipedia.org/wiki/Extract,_transform,_load, last modified Mar. 18, 2012, printed Mar. 26, 2012.
"Extraction Transformation Load (ETL) Architecture Pattern," Enterprise Architecture-Information-Patterns, http://en.wikipedia.org/wiki/File:ETL_Architecture_Pattern.jpg, dated Aug. 8, 2010, downloaded Mar. 26, 2012.

* cited by examiner

*Primary Examiner* — MD. I Uddin (57) ABSTRACT

A method and system for archiving data is provided. The method includes an extraction stage, a load stage, and a production merge stage. In the extraction stage, incoming files from a source system are extracted, where each incoming file has data records. Upon determining that the incoming files are of different data record types, the incoming files are split by record type. The files are also parsed. In a load stage, all files from a load ready directory are placed together in a single batch with a common RUNID for each data record type. In a production merge stage, all files made available from the load stage are processed. The processed files are loaded into a data warehouse. Each stage operates independently of any other stage. Each stage is also iterative and circular.

22 Claims, 6 Drawing Sheets

ETL DATA TRANSIT METHOD AND SYSTEM

BACKGROUND

Data is often migrated from one location to another for data warehousing (DW). Present data migrations are generally performed by Extract, Transform, Load (ETL) processes. ETL is a process in database usage and warehousing that involves extracting data from outside sources; transforming the data to fit operational needs; and loading the data into the target database or warehouse. Many data warehousing processes are capable of consolidating data from different sources. Common data source formats include relational databases, and flat files, but may also include non-relational database structures such as an Information Management System (IMS), Virtual Storage Access Method (VSAM), Indexed Sequential Access Method (ISAM), etc.

Known ETL approaches typically involve one of two approaches: (i) large volume, but low frequency; and (ii) high frequency, but low volume. In the first approach, large volumes of files are processed linearly in a batch window. This processing typically occurs after business hours. In the second approach (i.e., active, trickle), relatively small data volumes are continuously loaded in near real time throughout the day. Neither approach provides continuous real time large volume data storage. Indeed, ETL processes involve considerable complexity, which may lead to bottlenecks in operation and speed limitations especially in systems in which access to such data in real time is desirable. The range of data values or data quality in an operational system may exceed the capability of traditional ETL systems that rely on linear processing, where the extraction, transformation, and loading are preformed in sequence. For example, the linear processing of traditional ETL systems may lack the speed requirements to process the data in real time. As the volume of data that is available for archiving grows, it is becoming increasingly more challenging to process this information. In this regard, a common source of problems in ETL is a large number of dependencies among ETL tasks. For example, task 2 can only start after the completion of task 1, and task 3 can only start after the completion of task 2. Thus, when one stage slows down, all the subsequent stages are delayed, having to wait until processing completes in the prior stage.

Hence a need exists for an archiving method and system that provides loading, is capable of being queried, and archived on a single platform in a time and cost efficient way.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

Figure 1A:
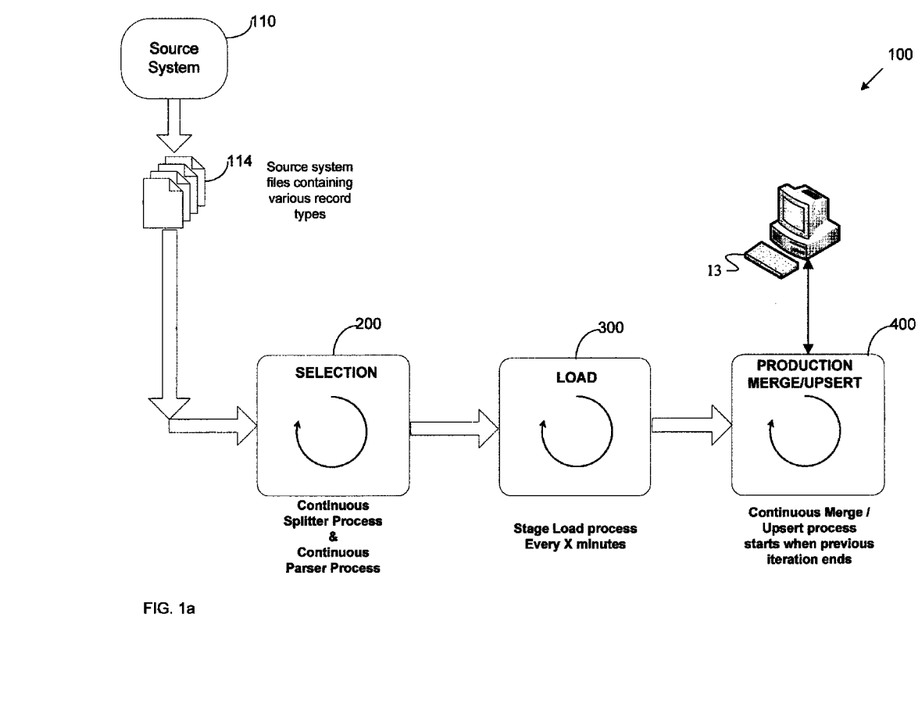
FIG. 1a illustrates a system providing a framework for an ETL Data Transit (ETL/DT) process flow.

The various examples discussed below enable loading querying, and archiving data continuously on a single platform in a cost efficient way. Reference now is made in detail to the examples illustrated in the accompanying drawings and discussed below. FIG. 1a illustrates a system 100 providing a framework for an ETL Data Transit (ETL/DT) process flow. System 100 is a highly flexible and scalable ETL/DT that provides for expedited loading of substantial amounts of data into a data warehouse (DW) from different platforms, ranging from flat files to relational databases from a source system 110. For example, source system 110 may be a single server, co-located servers, or geographically distant servers. Such loading of data may be performed on a continuous basis (i.e., 24 hours per day, every day of the week). The ETL/DT process flow of system 100 is not linear; rather, the ETL tasks are broken into multiple independent, circular, and iterative processes. In linear processing the extraction, transformation, and loading are preformed in sequence, where each stage waits for the prior stage to complete its data processing before it can commence.

The system 100 comprises a source system 110, an extraction stage 200, a load stage 300, and a production merge/upsert stage 400. Each stage provides an independent process. The system 100 facilitates data movement from the source system 110 to a target warehouse during the load stage, where the data is stored. The data can be later retrieved from, for example, a terminal or personal computer (PC) 13. The source system 110 may comprise files 114 containing records of various record types. For example, the source system 110 may be switches in a network, providing records relating to text messages usage, data sessions for mobile devices, and other usage records.

In the selection stage 200, data is received from the source system 110. Each of the files 114, which may contain various record types, undergoes a continuous splitter process and a continuous parser process. The splitter and parser processes are discussed in more detail later. The selection stage 200 is circular and continuous. Put differently, the selection stage 200 operates independently of the source system 110 and the load stage 300, in that it does not wait for data to be available from the source system 110 or the readiness of the load stage 300. Instead, the selection stage 200 is circular in that it continuously cycles through a splitter and parser process for any data that may be available from the source system 110.

The extracted data, which has been split and parsed in the selection stage 200, is provided to the load stage 300. The load stage 300 applies a series of rules or functions to the extracted data from the source system 110 to derive the data for loading into the end target (i.e., in the production merge stage 400). For example, the data may be cleansed, reformatted, standardized, aggregated, and/or any number of business rules may be applied during the load stage 300. Similar to the selection stage 200, the transform stage is circular and continuous. For example, the load stage 300 operates independently of the selection stage 200 and the production merge stage 400, in that it does not wait for data to be available from the selection stage 200 or the readiness of the production merge stage 400. Instead, the load stage 300 continuously cycles through any information that has already been accumulated from the selection stage 200 at predetermined intervals, without waiting for data to become available for it to process.

The data from the load stage 300 is provided to the production merge stage 400. The production merge stage 400 loads the data into the end target (e.g., a data warehouse). The timing and scope to replace or append data are strategic design choices dependent on the business needs. For example, a history and audit trail of all changes to the data loaded in the data warehouse may be maintained. Similar to the selection stage 200 and the load stage 300, the production merge stage 400 is circular and continuous. For example, the production merge stage 400 operates independently of the load stage 300, in that it does not wait for data to be available from the load stage 300. Instead, the production merge stage 400 continuously cycles through any information that has already been accumulated from the load stage 300 at predetermined intervals, without waiting for data to become available for it to process. By making each stage independent from one another, the ETL/DT architecture allows for constant and un-interrupted access to the data by users and front-end applications 13. Further, the circular concept for each stage substantially increases data throughput. This ETL/DT architecture with its increased data throughput allows stored data to be compressed in the database without falling behind in its data processing. That is because, unlike prior art approaches, where data compression negatively impacts data storage and retrieval due to the additional time requirement, here new data continues to arrive on load servers, which is processed continuously.

Figure 1B:
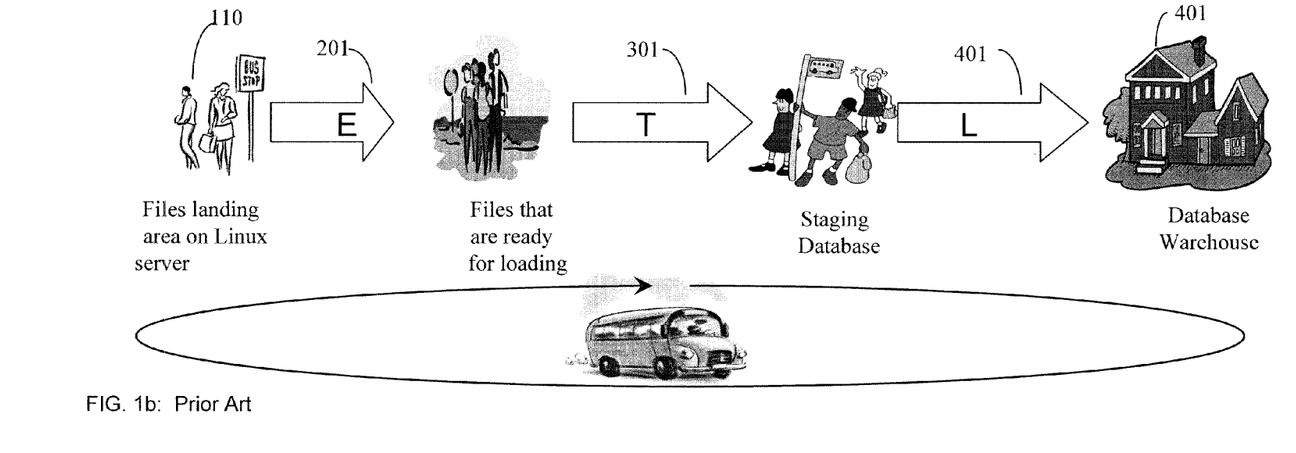
FIG. 1b illustrates a prior art system that stores information from a source system in a production database.

It may be helpful now to consider a high-level discussion of the independent and circular architecture of the present approach by comparing it to the linear approach of the prior art. FIG. 1b is a simplified diagram illustrating storing of information from a source system 110 in a database warehouse 401, consistent with the prior art. For example, a single "bus" is used to transport incoming files from a source system 110 through the extraction stage 201, transform stage 301, and the load stage 401 to reach the database warehouse 401. Data is transported linearly from one stage to another (e.g., E to T to L) only after the previous stage has finished its processing of the data and makes the data available to the next stage. In FIG. 1b, the "bus" represents a process that moves (e.g., transports) data. The people in FIGS. 1a and 1b represent data. Thus, the "bus" is used in a different context from a computer system bus which is at the circuitry level.

Figure 1C:
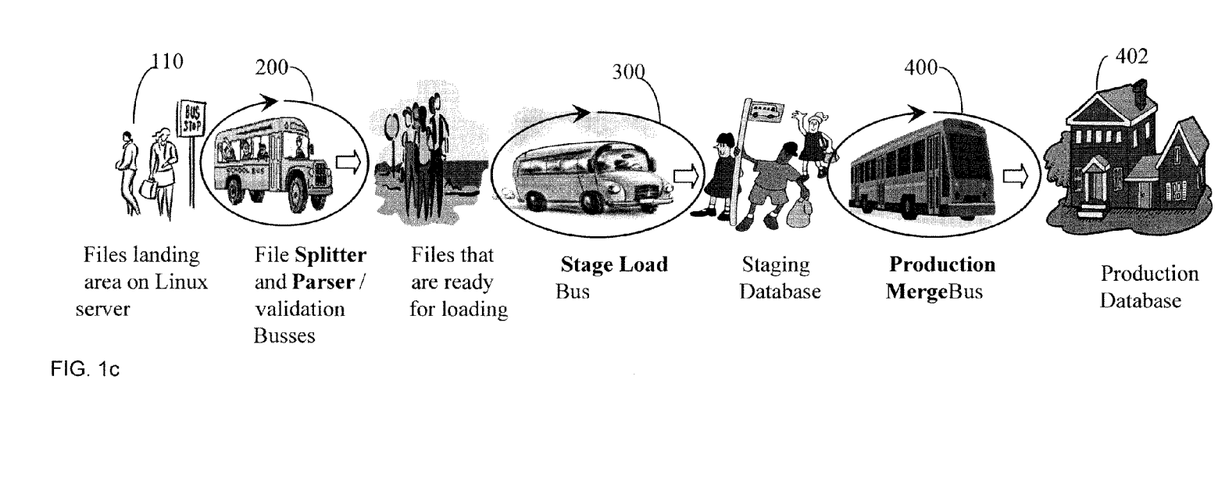
FIG. 1c illustrates an ETL/DT data transit process flow wherein each stage is independent and circular.

In contrast, FIG. 1c illustrates an ETL data transit process flow wherein each stage has its own "bus." Thus, each stage (i.e., 200, 300, and 400) is independent of the other stage in that it does not wait for specific data to be available before it is processed for the next stage. At every stage, any available data is processed in a circular fashion at predetermined time intervals. For example in the selection stage 200 data is extracted from the source system 110 (e.g., the passengers) without waiting for specific data to be available. Instead of waiting for specific data, the selection stage 200 continuously cycles through a splitter and parser process for any data (e.g., passenger) that may be available from the source system 110 and provides the processed data to the next stage (i.e., load stage 300).

Figure 2:
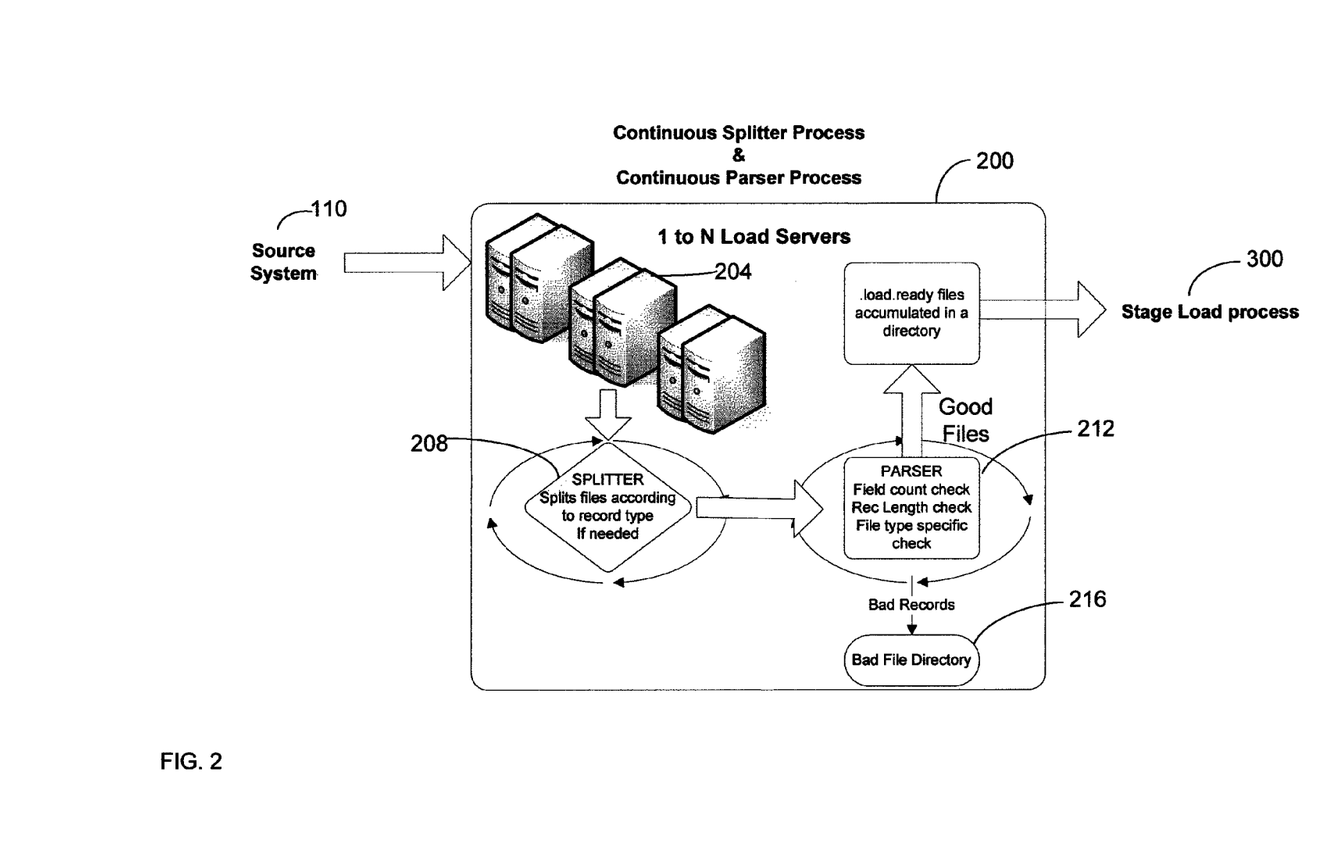
FIG. 2 illustrates an exemplary extract stage.

With the foregoing overview of the system, it may be helpful now to discuss each stage in more detail. FIG. 2 illustrates an exemplary selection stage 200, which extracts data from a source system 110. At least one load server 204 (e.g., 1 to N) receives the data from the source system 110. In one example, the load servers 204 are LINUX servers. Multiple servers may be used for load balancing and for increased throughput. The received data may comprise different file types, representing different data content. A configuration file holds a set of predetermined variables for each file type or source 110. For example, these variables may include load server 204 directory names, input record length or expected number of input fields, database schema names, and the location of database logon credentials. It should be noted that a record type (sometimes referred to as file type) pertains to input data from the source system 110. The configuration file is part of the ETL/DT source code that is available to the ETL/DT processes (e.g., a subroutine in the ETL/DT framework).

A record type (i.e., file) may be received by one or more load servers 204. In one example, each file type has a consistent record layout and is either in a delimited or fixed length format. Each file type may flow to its respective set of directories on the (e.g., LINUX) server 204. The configuration information is checked to determine if the input file contains multiple record types. An instance of the splitter 208 runs for each incoming file type on the load server 204. The splitter 208 splits the files according to the record type. The splitter 208 takes the various record types within the file, extracts the records, and places the records in files in separate processing directories. It is from these directories where the information is obtained by the next step: parsing. The splitter is independent of the parser and the parser is independent of the splitter. Each record type is treated as an individual file type. This splitting is performed on a continuous basis. For example, for a given input record from the source system 110, it is split and parsed on the same load server (e.g., 204). Even though the load stage can run on multiple load servers 204 for a given record type, once a record is received on a particular load server (e.g. first server 204), the selection stage 200 and the load stage 300 is run on the same load server (first server 204). As to the merge/upsert stage 400, it can run on a load server 204 (e.g., fifth server 204) that is different from the server where the original record was received (e.g., first server 204).

The parser 212 checks the record length (e.g., the number of fields for each input record). Fixed length files are then checked for the proper record length and delimited files are checked to ensure that they have the correct number of fields within each record. In either case, a validation check is performed to determine if the record length or the number of fields are correct (i.e., are of predetermined lengths). Upon determining that the number of fields is not of the predetermined length, the record is treated as "bad" and written to a separate file 216, for further investigation. Records passing this validation check are put into a "load.ready" file. For example, the name may be the same name as the original input file but with the "load.ready" designation. Parsing 212 is performed on a continuous basis on the data that is available on the load servers 204. This validation during parsing 212 is independent of any subsequent processing (e.g., the merge/upsert stage 400). The "load.ready" files of the same type (or "SOURCE") are accumulated on the load server to be processed by the next stage load 300.

Figure 3:
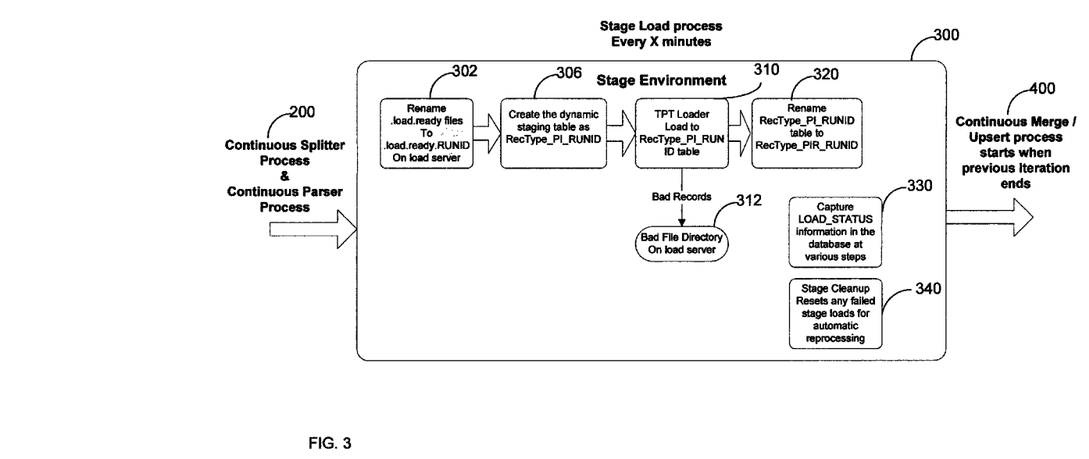
FIG. 3 illustrates an exemplary load stage.

FIG. 3 illustrates an exemplary load stage 300, which receives data from the selection stage 200, applies a series of rules or functions to the extracted data, and provides it to the subsequent production merge stage 400. The load stage 300 runs at predetermined intervals for each file type. For example, an interval for the load stage 300 is based on the volume of data coming from the source system 110 and the specific business needs. The intervals for load stage 300 are configurable by file type and by load server 204. It may be helpful now to describe how intervals for a load stage 300 are configurable by way of example. In one embodiment, all six load servers (e.g., 1 to 6 in 204) are capable of running any file type. In one embodiment five of the six load servers (e.g., 1 to 5) are configured to run every 15 minutes while the remaining load server (e.g., 6) is configured to run every 30 minutes. These intervals (e.g., of 15 minutes and 30 minutes) are based on the volume of data that is received from the source system 110 and the specific business needs.

For example, where volume is very large while storage capacity is low (e.g., in load server 204), a shorter interval allows data to be processed sooner and removed from the load server 204. In examples where speed requirements are relaxed and load server 204 storage is plentiful, the load stage 300 interval may be longer. It should be noted that a subsequent iteration of a load stage 300 can begin prior to the completion of the previous iteration of load stage 300 for the same file type on the same load server 204.

In one example, the load stage 300 takes all of the "load.ready" output files from the selection stage 200 and batches them together (e.g., stamps them) with a common "RUNID" on a load server (step 302). The RUNID is a combination of load server information along with the date and timestamp of the Stage Load process. For example, a pair of 2 digit numbers can be used to identify any of the six load servers 204.

In step 306, a first staging table to hold the data is dynamically created. For example, a different "CREATE TABLE" template is used for each given file type. Thus each record type has a different template. Each template contains a CREATE TABLE DDL SQL statement that is specific to a particular record type and contains the database column definitions to be loaded for that record type. The dynamically named staging table 306 is created using the template for the specified record type. This first staging table is one of several (e.g., 3) levels of staging tables. This first staging table is dynamically named to include the file type and RUNID. In one example, the initial stage table is referred to as the "PI" table. In step 310, all files within a RUNID batch are loaded via a database load utility to the level 1 staging or "PI" table. For example, a Teradata loading tool, named Teradata Parallel Transporter (TPT) may be used for the loading of the data. TPT is a parallel multi-function load environment that provides scalable access to data sources from a single interface using a single structured query language (SQL) like scripting language or an open API. It provides a parallel environment. Many files (e.g., dozens or even thousands) can be loaded using a single script. TPT utilizes system resources efficiently by allowing distribution of the workload across CPUs, eliminating bottlenecks in data loading process. For example, the TPT loader 310 loads the Rectype_PI_RUNID table. The TPT job reads in 1 to N load.ready files and loads them into the Rectype_PI_RUNID. In one example, the number of files processed by step 310 may be in the hundreds or even thousands.

For example, multiple load stage 300 processes are run in parallel for the same file type/SOURCE at any given time for fast processing. Records that are rejected by the loader 310 are written to a special area 312 on the load server for further investigation. For example, any record that the load utility was unable to process may be rejected (e.g., considered "bad"). Common causes of this rejection include invalid data format, invalid data length, and incompatible data types for one or more fields in the data.

In step 320, the resulting "PI" table is then either renamed to the 2nd level staging table ("PIR" table) or the SQL is processed to create the "PIR" table. This transformation/denormalization SQL is identified by a "denorm" script for each particular file type. Not all record types have a "denorm" script. In this regard, if a "denorm" script does not exist for a record type, then the first level staging table "PI" is renamed to the second level staging "PIR" table without any data modification at this point in the process. For example, a "denorm" script defines how transformations or denormalizations are specified and customized for each file type at this step of processing the data. The "denorm" script is one of several customizable interfaces at the file type (e.g., record type) level. If the script exists, it allows for data to be pre-joined with other reference data in the DW and loaded together as one unit. This "pre-joining" provides faster end user response time by not requiring the user to provide the table joins themselves. However, the "denorm" scripts can be used for other purposes as well. For example, the "denorm" script can be used to transform, summarize, and/or to create derived data values. Once the resulting "PIR" table exists, the data in the batch or RUNID is considered to be "ready" for the next step in the process. The LOAD STATUS entries are logged throughout the stage load and production merge (upsert) processes (e.g., step 330). For example, these status entries may be used to monitor load timings and throughput. The logging of LOAD STATUS information may occur at several points within stages 300 and 400. For example, the logging occurs between each of the sub-processes within the block. The logging provides for performing historical analysis on the timing and throughput of each sub-process. Further, it may facilitate analysis of the time it takes data to travel from a load directory on load server 204 to the final target in the DW.

The load stage 300 is configured to run at predetermined intervals on the respective load server (e.g., 204 in FIG. 2.) This predetermined interval can vary by file type and/or speed of the load server. For example, the input to the load stage 300 includes multiple data files and the output includes a second level stage table (e.g., "PIR" staging table).

In one example, if there is a failure in the load stage 300, the files and related database objects for the affected RUNID are reset through a standalone Stage Cleanup process 340. For example, here "reset" in connection with a RUNID includes renaming all of the associated input files by removing the RUNID designation and ensuring that they have the "load.ready" designation so that they get processed by the next iteration of load stage 300. Additionally, any associated level 1 "PI" staging table, any temporary TPT work tables, and any checkpoint log files created by the TPT load utility are also removed for the failed RUNID. As the input files from the failed RUNID are "re-processed" by the subsequent iteration of the load stage 300, they receive a new RUNID designation. Such cleanup is relatively quick and does not impede data throughput because it affects only a single iteration of the load stage 300, while allowing the selection stage 200, subsequent iterations of the load stage 300, and the production merge stage 400 to continue unabated. Accordingly, such approach allows data to be continuously available to potential users and to any front-end application.

Figure 4:
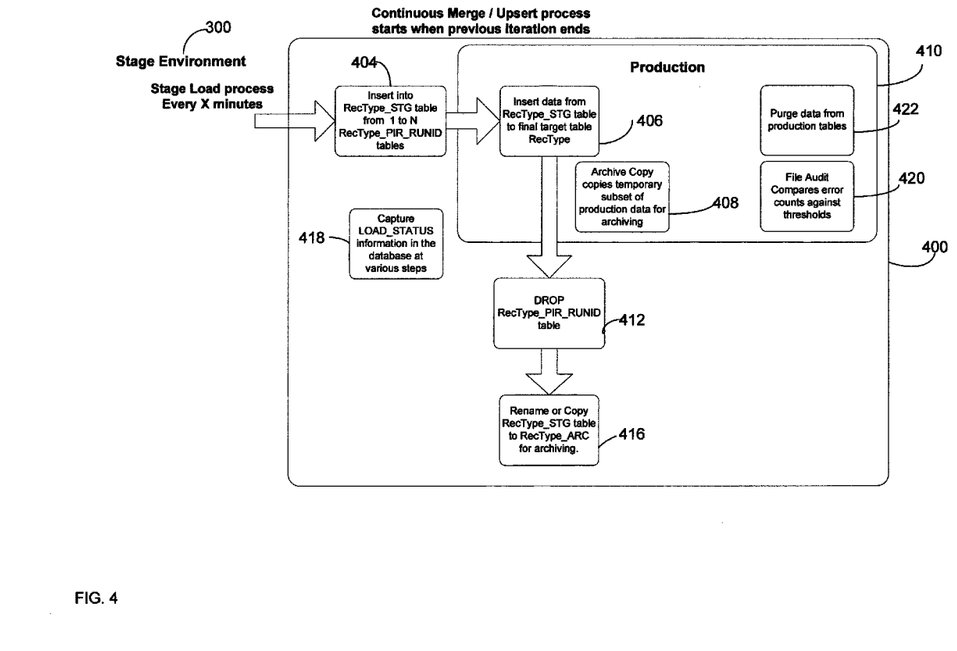
FIG. 4 illustrates an exemplary production merge (upsert) stage.

FIG. 4 illustrates an exemplary production merge (upsert) stage that receives data from the load stage 300. A purpose of the merge process stage 400 includes moving data from the "staging" database environment (i.e., stage 300) into the "production" database environment. In one example, once data is inserted into the "production" DW, it is not altered any further. In this context, the term "merge" or "upsert" means to update or insert. For example, data is inserted (e.g., appended) from staging to production.

Data is archived at two points in the production merge stage, namely in step 408 and step 416. For example, in step 416, the "ARC" tables are created as part of the 400 stage. In stage 400 any "ARC" tables that exist are processed by a first archival process. For example, the archival process is a utility used by the ETL/DT system to copy the data from a table in the database to an external storage device, such as a tape. The tapes may then stored off-site and later retrieved on request. In FIG. 4, steps 408 and 416 are used to create the table that is archived. For example, the archiving may be provided by a database administrator (e.g., on their own schedule) independent of the ETL/DT flow discussed herein. For example, the database administrator may archive the tables nightly or weekly. Once the tables are archived to a tape, the tables may be removed from the system by the system administrator.

Step 408 indicates that at the final target DW archiving also occurs. The data that is archived in step 408 is not the same set of data that is being merged in step 406. Thus, step 408 is independent of step 406. For example, step 408 copies data that may be old (e.g., several days). In contrast, data that is merged in step 406 is current. The current data is copied to a "PROD ARC" table with a date as part of its table name. Another stand alone archival process later archives the data copied in step 408.

The production merge stage 400 (sometimes also referred to as the upsert stage) runs continuously in a loop. For example, in the production merge stage 400, there is an upsert process for each file type (i.e., step 404). The upsert is configured to be independent from the load stage 300 for any file type. Further, it can run on any of the load servers 204. For example, in step 404, the upsert processes data from 1 to N stage loads for its corresponding file type. The main handoff between stage 300 and stage 400 block relates to the 1 to N "PIR" tables. For example, each 300 block iteration provides one "PIR" table. However, the 400 block reads as input all existing "PIR" tables for its file type. It was a design decision based on performance testing to combine all of the available "PIR" tables into a 3$^{rd}$ level staging table "_STG" prior to the final target merge.

In one example, only one upsert per file type runs at any point in time. That is because only one process writes to a given database object at a given point in time. In this regard, the final DW target table is a single database object. For multiple upserts to run at a given point in time, several controls would need to be in place to assign and keep track of the "PIR" tables to be processed by each run of the upsert merge stage 400. Further, multiple instances of the third level staging table "_STG" would be needed. Accordingly, the additional complexity and the introduction of database locking issues on the final target table in step 406 indicate that running one upsert per file type at any point in time is preferred.

The upsert process stage 400 also assigns a RUNID (e.g., server, date, and time) to each upsert iteration. This information is retained in the log filename and under an archive (e.g., ARC) table name (discussed later). The upsert process 400 takes any existing "PIR" staging tables for the same file type and combines the data within into a single final staging table (also known as the "_STG" table). The insert SQL is built dynamically using a Relational Database Management System (RDBMS) data dictionary. In one example, the "_STG table" is also referred to as the 3rd level staging table.

There is an "_STG" table for each file type/SOURCE. The maximum number of "PIR" staging tables to process during an Upsert iteration is configurable. For example, if it were desired to "throttle" (e.g., limit) the amount of data processed by an iteration of the upsert process stage 400, a limit could be placed on the number of "PIR" tables that each stage 400 can process. This configurable limit is based on the number of "PIR" tables and not by the number of records within the "PIR" tables. For example, if there are more "PIR" staging tables than the maximum preset limit for an upsert, then the "PIR" staging tables are processed in a first in-first out order based on the RUNIDs of the "PIR" staging tables. The order is specified in the RUNIDs of the "PIR" staging tables. Since the RUNID includes a date and time-stamp, the date and time is used to build a sorted list of "PIR" tables to process in first-in-first-out (FIFO) order. FIFO may be used to reduce the latency of data arriving in the final target DW in step 406. In one example, any additional columns derived via denormalizations are added to the "_STG" table such that the resulting table structure matches the "PIR" staging tables. In this regard, "stage alter" scripts drive the "_STG" modification.

The data is then inserted (or merged) into a production table. During this merge, the process 410 checks whether there is a special "merge" SQL that provides another interface point for any merge optimizations, transformations, summarizations, or further denormalizations. An interface point may be a subroutine call to perform file-type specific logic. For example, some file-types require specialized logic that only pertains to that particular file-type. Specialized logic, such as summations, transformations, and/or denormalizations can be performed for specific file-types with these "interface points." If the file-type specific module exists, then the interface module is executed. Upon determining that there is no special "merge" SQL, the data is inserted into production with a generic Insert/Select statement.

In step 406, after the data has successfully been inserted (or merged) into the production table, all participating individual "PIR" tables are removed. An "Archived _STG" table (or "Stage ARC" table) is also created. In step 416, this table is created in one of 2 ways. In one example, by default the "_STG" table may be simply renamed as an "_ARC" table. In another example, where user views are placed on the _STG table (e.g., view includes the level 3 staging table as well as the production target table) for expedited data access, the "ARC" tables are populated by copying the data from the "_STG" table. The term "user view" is a user interface (e.g., monitor), which provides a user the ability to query. In this regard, the copy is created to avoid RDBMS locking issues. For example, relational databases may include locking mechanisms to ensure data integrity. In most database systems, a table is not altered while it is being accessed. In contrast, by way of example, when a user reads from the _STG table via the user view, then a DDL (data definition language) command cannot execute on the _STG table until the user query finishes. To avoid the possibility of a user query impacting or blocking the execution of the stage 400, the "stage ARC" table is created by copying the data from the _STG table instead of executing the RENAME command, which is a DDL command requiring an exclusive database lock on the object. Otherwise, the merge/upsert process execution time may be negatively impacted for having to wait for a user query to complete. In either example, an "_ARC" table is provided with an associated RUNID assigned by the upsert process 400. The RUNID here is assigned by the upsert process 400 and is different from the RUNIDs from the individual stage loads that contributed to this upsert iteration.

The upsert step 400 loops continuously. As soon as a successful upsert completes, another one cycle is initiated. In one example, the upsert step 400 is configured to "sleep" when there are no "PIR" tables to be processed.

As indicated in step 418 in FIG. 4, at various stages in the process, entries are inserted into a Load Status table in the RDBMS. This table captures the start time of each step in the overall process (e.g., 200 to 400). This allows for the tracking and reporting of processing times for the entire process or for any subset of steps within the process. Additionally, metrics such as record counts, file counts, and merged production row counts are also recorded.

For each input file, its number of records, its load server, and associated RUNID is logged in a database table. This table is similar to the LOAD_STATUS table but is specific to each input file. While the LOAD_STATUS table captures information about the ETL/DT iterations, this table (e.g., FILE_INFO table) captures information about each file processed along with the associated RUNID of the load stage 300 that processed the file. This table helps determine which Stage Load iteration and subsequent upsert iteration is responsible for loading any one of the volume of files received in a timeframe (e.g., daily).

The production merge/upsert step 400 also includes a file audit step 420. The file audit step 420 takes ".bad" file information from the parser 212 (discussed in the context of the splitting and parsing of the extraction step 200 above) and the rejected data (i.e., 312) from the load step 300 and loads this information into the RDBMS for auditing. The error volumes are audited against predetermined thresholds for each file type at the record count and file count levels. Any error counts exceeding the thresholds trigger an alert for further investigation. The File audit runs at predetermined intervals. For example, the thresholds are based on the file type and are contained in a database table. They can be set manually by updating the database table. The thresholds are based on historic patterns.

In step 408, an Archive Copy (ARC) process runs independently of the ETL/DT load stage 300. For example, the ARC process provides a regular (e.g., daily) copy of data for archival. The ARC Copy uses a dynamic configuration table that identifies database tables and date ranges to copy. This step allows for the grouping of tables or SOURCES by "Application Group." In this step, all tables in the configuration table for a particular Application Group are processed. The ARC process tracks the last date copied for archival. In one example, if the process does not run on a particular day, it automatically "catches up" the next time it runs, without directly affecting the other stages (e.g., 200 and 300). The resulting data is placed into a production archive (prod ARC) table. The prod ARC table should not to be confused with the ARC tables from the staging environment discussed in the context of step 416. The staging ARC tables provide a mechanism to restore application data up to current level in response to data loss in the RDBMS.

In step 422, there is a PURGE process that uses a configuration table within the RDBMS. The configuration table stores the tables/SOURCES to be purged. It also includes the retention criteria for each table. Based on the entries in the configuration table, historic application data partitions are dropped from the production tables. Partitions are dropped without impacting the selection stage 200 or the loading stage 300. In one example, the historic data is purged from a "shadow" table to avoid (i) read/write contention with the ETL/DT load process and (ii) read contention with front-end applications.

Figures 5, 6:
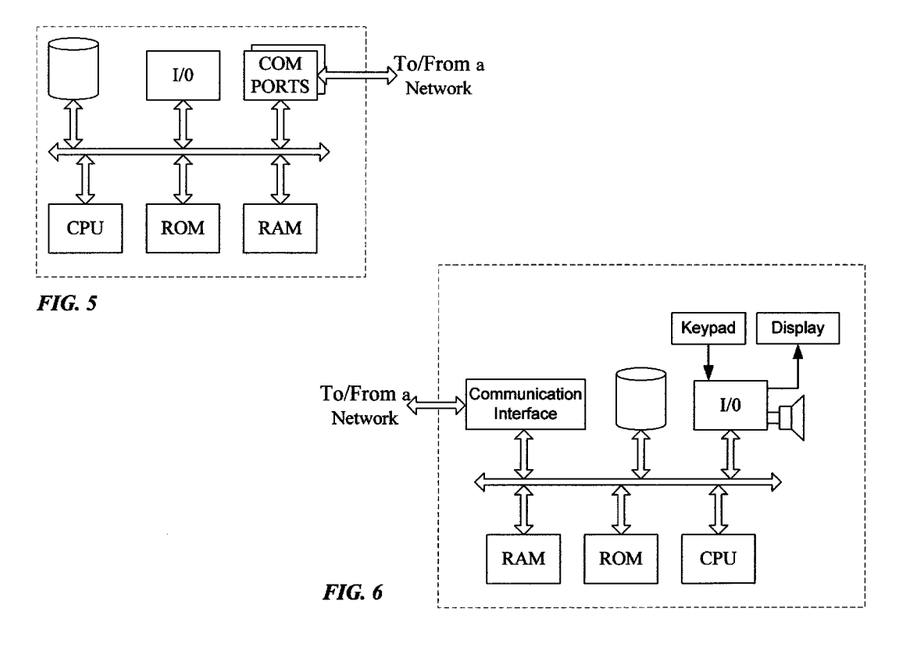
FIG. 5 illustrates a network or host computer.
FIG. 6 depicts a computer with user interface elements.

FIGS. 5 and 6 provide functional block diagram illustrations of general purpose computer hardware platforms. FIG. 5 illustrates a network or host computer platform, as may typically be used to implement a server. FIG. 6 depicts a device with user interface elements, as may be used to implement a personal computer or workstation although the device of FIG. 6 may also act as a server if appropriately programmed. It is believed that the general structure and general operation of such equipment as shown in FIGS. 5 and 6 should be self-explanatory from the high-level illustrations.

A general purpose computer configured as a server, for example, includes a data communication interface for data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run, for example, load server 204 in FIG. 2.

A server such as a general-purpose personal computer typically comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes.

The software functionalities involve programming, including executable code as well as associated stored data, e.g. files used for the extraction, loading, and merge/upsert of source system data. The software code is executable by the general-purpose computer that functions as the server and/or that functions as a client device. In operation, the code is stored within the general-purpose computer platform. At other times, however, the software may be stored at other locations and/or transported for loading into the appropriate general-purpose computer system. Execution of such code by a processor or central proceeding unit of the computer platform enables the platform to implement the technique of ETL/DT flow described herein, in essentially the manner performed in the implementations discussed and illustrated herein.

Hence, aspects of the methods of data storage outlined above may be embodied in programming. Program aspects of the technology may be thought of as "products" or "systems" of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, system, or apparatus that comprises a list of elements does not include only those elements but may include other elements not expressly listed or inherent to such process, method, system, or apparatus. An element proceeded by "a" or "an" does not, without further constraints, preclude the existence of additional system elements in the process, method, system, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX: ACRONYM LIST

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

ARC—Archive Copy
CPU—Central Processing Unit
DVD—Digital Video Disc
DVD-ROM—Digital Video Disc Read Only Memory
DW—Data Warehousing
EEPROM—Electrically Erasable Programmable Read Only Memory
ETL—Extract, Transform, Load
ETL/DT—Extract, Transform, Load, Data Transit
IMS—Information Management System
ISAM—Indexed Sequential Access Method
PROM—Programmable Read Only Memory
RAM—Random Access Memory
RDBMS—Relational Database Management System
ROM—Read Only Memory
SQL—Structured Query Language
TPT—Teradata Parallel Transporter
VSAM—Virtual Storage Access Method

What is claimed is:

1. A method, comprising steps of:
in a selection stage:
   receiving incoming files from a source system, wherein each incoming file has data records;
   for each data record:
      extracting the data record from the respective incoming file;
      determining a data record type, from a plurality of different data record types, for the data record; and
      placing the data record into a data record type file for the determined data record type containing only data records of the determined data record type, the data record type file for the determined data record type being one of a plurality of data record type files, wherein:
         each data record type file is for a respective one of the different data record types;
         each data record type file for one of the different data record types contains only data records of the respective one different data record type; and
         each data record type file for one of the different data record types is located in a directory corresponding to the respective one different data record type; and
   for each data record type file for one of the different data record types:
      parsing the data record type file to produce a load ready file for the respective one different data record type, the load ready file for the respective one different data record type being located in the directory corresponding to the respective one different data record type and the parsing being performed independently of the data record extracting, determining and placing;
in a load stage:
   for each different data record type:
      placing all load ready files for the respective one different data record type from the respective directory corresponding to the respective one different data record type together in a single batch; and
in a production merge stage:
   processing all files made available from the load stage; and
   loading the processed files into a data warehouse;
wherein each stage:
   operates independently of any other stage;
   is iterative; and
   is circular.

2. The method of claim 1, wherein parsing comprises:
for each data record type file for one of the different data record types:
   determining, based on a predetermined length, an expected number of fields for the respective one different data record type; and
   for each data record within the respective data record type file:
      determining a number of fields;
      determining whether the determined number of fields matches the expected number of fields;

upon determining that the determined number of fields does not match the expected number of fields, sending the data record to a first fault directory; and
upon determining that the determined number of fields does match the expected number of fields, placing the data record into the load ready file for the respective one different data record type.

3. The method of claim 2, the load stage further comprising:
continuously processing the load ready files for each different data record type from each directory corresponding to each different data record type at predetermined intervals, without waiting for files to become available from the selection stage and without determining whether the production merge stage is ready to process additional files from the load stage.

4. The method of claim 3, the load stage further comprising:
for each iteration creating a first staging table, wherein each first staging table is dynamically named and the name includes the respective one different data record type and a RUNID, the RUNID including a timestamp.

5. The method of claim 3, wherein several load stage processes are run in parallel for the same data record type.

6. The method of claim 3, the load stage further comprising:
storing data rejected during the load stage in a second fault directory.

7. The method of claim 2, wherein the steps of extracting the data record from the respective incoming file, determining the data record type, Placing the data record into the data record type file for the determined data record type, and parsing the data record type file to produce a load ready file for the respective one different data record type are each:
independent of one another;
iterative; and
circular.

8. The method of claim 2, the production merge stage further comprising:
continuously processing the files provided by the load stage, at predetermined intervals, without waiting for files to become available from the selection stage for the production merge to process.

9. The method of claim 2, the production merge stage further comprising assigning a RUNID to each production merge stage iteration.

10. The method of claim 9, further comprising maintaining a history and audit trail of all changes to data loaded into the data warehouse.

11. The method of claim 2, further comprising compressing data loaded into the data warehouse.

12. A computer system configured as a server, the computer system comprising:
a processor;
a network interface coupled to the processor configured to enable communications via a communication network;
a storage device for content and programming;
a program stored in the storage device, wherein execution of the program by the processor configures the computer system to perform functions, including functions to:
in an extraction stage:
extract incoming files from a source system, wherein each incoming file has data records;
for each data record:
extract the data record from the respective incoming file;
determine a data record type, from a plurality of different data record types, for the data record; and
place the data record into a data record type file for the determined data record type containing only data records of the determined data record type, the data record type file for the determined data record type being one of a plurality of data record type files, wherein:
each data record type file is for a respective one of the different data record types;
each data record type file for one of the different data record types contains only data records of the respective one different data record type; and
each data record type file for one of the different data record types is located in a directory corresponding to the respective one different data record type; and
for each data record type file for one of the different data record types:
parse the data record type file to produce a load ready file for the respective one different data record type, the load ready file for the respective one different data record type located in the directory corresponding to the respective one different data record type and the parse function performed independently of any of the function to extract data records, the function to determine a data record type, and the function to place data records;
in a load stage:
for each different data record type:
place all load ready files for the respective one different data record type from the respective directory corresponding to the respective one different data record type together in a single batch; and
in a production merge stage:
process all files made available from the load stage; and
load the processed files into a data warehouse;
wherein each stage:
operates independently of any other stage;
is iterative; and
is circular.

13. The computer system of claim 12, wherein the function to parse comprises:
for each data record type file for one of the different data record types:
determine, based on a predetermined length, an expected number of fields for the respective one different data record type; and
for each data record within the respective data record type file:
determine whether the determined number of fields matches the expected number of fields;
upon a determination that the determined number of fields does not match the expected number of fields, sending the data record to a first fault directory; and
upon a determination that the determined number of fields does match the expected number of fields, placing the data record into the load ready file for the respective one different data record type.

14. The computer system of claim 13, wherein in the load stage the functions further comprise a function to:
continuously process the load ready files for each different data record type from each directory corresponding to each different data record type at predetermined intervals, without waiting for files to become available from the extraction stage and without determining whether the production merge stage is ready to process additional files from the load stage.

15. The computer system of claim 14, wherein in the production merge stage the functions further comprise functions to:
   continuously process the files provided by the load stage, at predetermined intervals, without waiting for files to become available from the selection stage for the production merge to process.

16. The computer system of claim 14, wherein in the production merge stage the functions further comprise a function to assign a RUNID to each merge stage iteration.

17. The computer system of claim 16, wherein the functions further comprise a function to maintain a history and audit trail of all changes to the data loaded into the data warehouse.

18. The computer system of claim 13, wherein the functions to extract the data record from the respective incoming file, determine the data record type, place the data record into the data record type file for the determined data record type, and parse the data record type file to produce the load ready file for the respective one different data record type are each:
   independent of one another;
   iterative; and
   circular.

19. The computer system of claim 18, wherein in the load stage the functions further comprise a function to:
   for each iteration create a first staging table, wherein each first staging table is dynamically named and the name includes the respective one different data record type and a RUNID, the RUNID including a timestamp.

20. The computer system of claim 18, wherein several load stage processes are run in parallel for the same data record type.

21. The computer system of claim 18, wherein in the load stage the functions further comprise a function to:
   store data rejected during the load stage in a second fault directory.

22. The computer system of claim 12, wherein the functions further comprise a function to compress the data loaded into the data warehouse.

* * * * *